United States Patent
Sugatoor et al.

(10) Patent No.: US 10,944,534 B2
(45) Date of Patent: Mar. 9, 2021

(54) IDENTIFYING DOORWAY ACCESS POINTS

(71) Applicant: Hewlett Packard Enterprise Development LP, Houston, TX (US)

(72) Inventors: Manaswini Lakshmikanth Sugatoor, Bangalore (IN); Gopal Agarwal, Bangalore (IN); Pradeep Iyer, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/282,245

(22) Filed: Sep. 30, 2016

(65) Prior Publication Data

US 2018/0097589 A1 Apr. 5, 2018

(51) Int. Cl.
| | |
|---|---|
| *H04L 5/00* | (2006.01) |
| *H04W 4/02* | (2018.01) |
| *H04W 24/02* | (2009.01) |
| *H04W 88/08* | (2009.01) |
| *H04W 84/12* | (2009.01) |
| *H04W 88/12* | (2009.01) |
| *H04W 48/20* | (2009.01) |

(52) U.S. Cl.
CPC .............. *H04L 5/006* (2013.01); *H04W 4/023* (2013.01); *H04W 24/02* (2013.01); *H04W 48/20* (2013.01); *H04W 84/12* (2013.01); *H04W 88/08* (2013.01); *H04W 88/12* (2013.01)

(58) Field of Classification Search
None
See application file for complete search history.

(56) References Cited

U.S. PATENT DOCUMENTS

| | | | | |
|---|---|---|---|---|
| 7,826,837 B1* | 11/2010 | Sylvester | ............. | H04W 24/06 455/423 |
| 2004/0165550 A1* | 8/2004 | Beach | ................. | H04L 12/4625 370/328 |
| 2005/0195761 A1* | 9/2005 | Alicherry | ............. | G01S 5/0289 370/328 |
| 2006/0178147 A1* | 8/2006 | Jagadeesan | ........... | H04W 36/14 455/436 |
| 2007/0149172 A1* | 6/2007 | Dickinson | ............. | H04W 92/02 455/411 |
| 2009/0043504 A1* | 2/2009 | Bandyopadhya | ...... | G01C 17/38 701/469 |
| 2009/0224977 A1* | 9/2009 | Bonner | ..................... | G01S 5/02 342/378 |
| 2009/0227271 A1* | 9/2009 | Lee | ......................... | H04W 4/02 455/456.6 |
| 2009/0298505 A1* | 12/2009 | Drane | ..................... | H04W 4/02 455/446 |
| 2010/0007521 A1* | 1/2010 | Cornwall | ................. | H04Q 9/00 340/870.02 |

(Continued)

*Primary Examiner* — Ayaz R Sheikh
*Assistant Examiner* — Tarell A Hampton
(74) *Attorney, Agent, or Firm* — Hewlett Packard Enterprise Patent Department (57) ABSTRACT

An example system in accordance with an aspect of the present disclosure includes a controller to store Received Signal Strength Indicator (RSSI) information for an unassociated client detected by an access point (AP) of a wireless network. The controller is to identify that the unassociated client has associated with the wireless network, and identify the AP as a doorway AP in response to the client associating to the AP.

20 Claims, 4 Drawing Sheets

(56) References Cited

U.S. PATENT DOCUMENTS

| | | | |
|---|---|---|---|
| 2010/0049594 A1* | 2/2010 | Bonner | G06Q 20/208 |
| | | | 705/26.1 |
| 2010/0118830 A1* | 5/2010 | Stephenson | H04L 63/10 |
| | | | 370/331 |
| 2010/0322214 A1* | 12/2010 | Workman | H04W 4/029 |
| | | | 370/338 |
| 2011/0060652 A1* | 3/2011 | Morton | H04W 4/043 |
| | | | 705/14.58 |
| 2011/0119132 A1* | 5/2011 | Morton | G06Q 30/02 |
| | | | 705/14.53 |
| 2012/0182172 A1* | 7/2012 | Sorensen | H04W 64/00 |
| | | | 342/28 |
| 2012/0276918 A1* | 11/2012 | Krattiger | H01Q 1/007 |
| | | | 455/456.1 |
| 2012/0278132 A1* | 11/2012 | Weigh | G06Q 30/0261 |
| | | | 705/7.34 |
| 2013/0337842 A1* | 12/2013 | Wang | A61B 5/0024 |
| | | | 455/456.4 |
| 2014/0169352 A1 | 6/2014 | Moir et al. | |
| 2015/0065177 A1* | 3/2015 | Phillips | G08B 21/0236 |
| | | | 455/456.3 |
| 2015/0066519 A1* | 3/2015 | Lin | G06Q 50/10 |
| | | | 705/1.1 |
| 2015/0348146 A1* | 12/2015 | Shanmugam | G06Q 30/0603 |
| | | | 705/71 |
| 2016/0077188 A1* | 3/2016 | Steiner | G01S 5/0263 |
| | | | 455/456.1 |
| 2016/0080485 A1* | 3/2016 | Hamedi | H04L 67/02 |
| | | | 709/204 |
| 2016/0269984 A1* | 9/2016 | Hallett | H04W 48/16 |
| 2018/0004178 A1* | 1/2018 | Haines | F24F 2120/10 |

\* cited by examiner

IDENTIFYING DOORWAY ACCESS POINTS

BACKGROUND

A given Wireless Local Area Network LAN (WLAN), or Wi-Fi network deployment, such as at a store or office space, can contain Access Points (APs) to enable clients to wirelessly connect to the network. The network can include a single AP, a set of two or three APs, multiple floors having multiple APs, and so on.

DETAILED DESCRIPTION

Location information for potential visitors to a network deployment may not be directly available, but can be inferred from signal information from the clients as detected by the wireless network. Such information is valuable for determining footfalls of clients inside a store or other location where a wireless network is deployed, as well as footfalls of clients in the vicinity of the store or directly in front of a doorway (a store may have one or more doorways).

However, signal information can be noisy and subject to imprecision, if analyzed based on static thresholds for the signal information. Furthermore, the signal information can be influenced by placement of the AP(s), which can further lead to incorrect classifications of foot traffic. The calculation of footfall based on static thresholds can be influenced by the orientation of the store/network deployment, and the placement of APs in that orientation. For example, a given orientation of a store could cause clients who are well outside of the store to happen to be close to a given AP in the store, resulting in incorrectly counting such clients as visitors to the store. Clients in adjacent stores could be detected as passersby or visitors, if the store walls are not Radio Frequency (RF) insulated. Clients across floors can be detected/heard as passersby. Dwell time of such clients may lead to incorrect approximations as footfalls inside the store. Additionally, clients in the store incorrectly may be heard as passersby, and a client outside the store incorrectly can be recorded as a visitor.

To address such issues, some example implementations described herein may discern actions in client movements, such that the actions reveal whether a given client has the potential to enter the store. Accordingly, a client who is detected/heard by an AP in the store for the first time can be categorized as a passerby. A client whose signal information, such as Received Signal Strength Indicator (RSSI) information, is reported to be over a given threshold for a given period of time, can be categorized as a visitor. For example, a client having an RSSI value greater than or equal to −64 decibel-milliwatts (dBm) with a dwell time of greater than one minute can be categorized as a visitor, associated with a given footfall pattern relative to the store/wireless network.

Furthermore, some example implementations can consider client paths through the wireless network, such as at which RSSI the client first appeared on an AP. If the client enters into the store, by tracking the client's movement paths, some example implementations can determine whether a new client appears on the same RSSI band (range of RSSI values) as a previously categorized visitor. If patterns reveal that many clients have passed through on the same given range/RSSI band and then successfully entered the store and/or resulted in associations with the wireless network with dwell time inside the store, some example implementations can further classify such clients.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. As used herein, 'wireless local area network' (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. As used herein, dwell time is the amount of time a client has spent, e.g., how long the client has been detected by the AP. In a basic example for the purpose of illustration and comparison, a wireless network and/or its APs can be operated in a proximity mode. The wireless network can be represented as a set of at least one AP(s), which can be given the same tag name. Location analytics can be run in the proximity mode, to collect the RSSI feed from the APs, indicating the signal strength of the clients. The tag name for the APs can be provisioned during deployment of the wireless network, and a controller (which can execute a location engine) can reference more specific information about the tag name for a given AP. Because the APs in the wireless network were given the same tag name, they form a geofence, such that the client is reported by the AP that hears the client at the strongest RSSI. This basic geofencing approach can suffer from noise in the data, which decreases accuracy of footfall counts, as well as suffering from the drawbacks set forth above regarding store layout and AP placement subject to inaccurately detecting clients not in the store.

In contrast to a geofencing approach, some example implementations described here can cut down on noise in the data to obtain improved footfall counts, by keeping track of clients who enter the wireless network/store (e.g., via their paths), and become associated in the store. The association of a client to the network is a useful indication that the client is inside the store. Such Wi-Fi location analytics related to proximity mode can be used to identify doorway APs, and passersby/visitors of the doorway APs and wireless network. Advantages to such approaches include the ability to determine footfall of clients in a doorway of a store more accurately, predict probable visitors into the stores from the passerby position/path, and determine footfall of visitors in the store while discriminating from clients heard from across floors, through walls, or other locations not inside the store.

Figure 1:
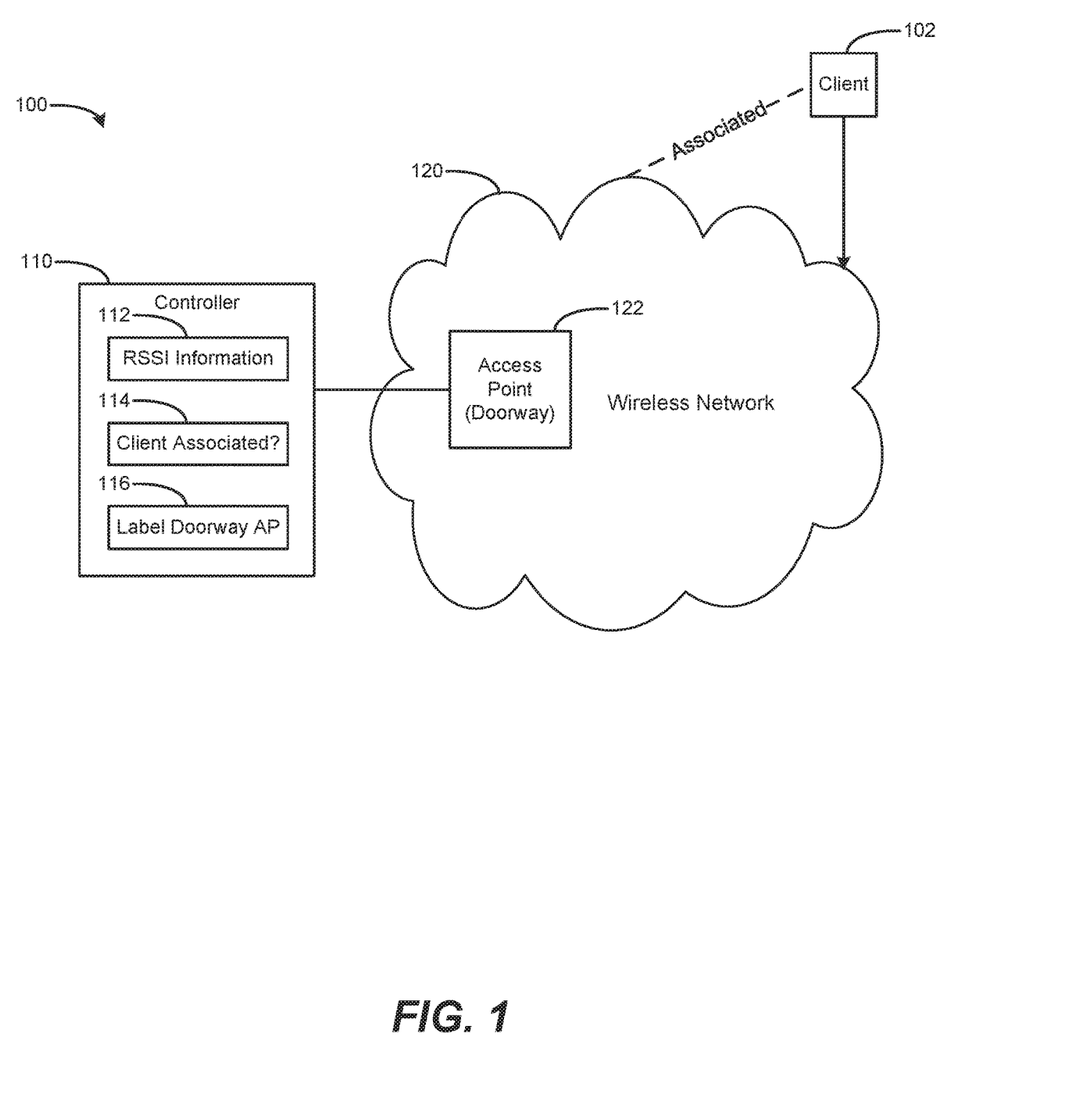
FIG. 1 is a block diagram of a computing system including a controller to store Received Signal Strength Indicator (RSSI) information according to an example.

FIG. 1 is a block diagram of a computing system 100 including a controller 110 to store Received Signal Strength Indicator (RSSI) information 112 according to an example. The RSSI information 112 can be obtained from an unassociated client 102 that is detected by an access point (AP) 122 of the wireless network 120. The controller 110 can identify whether the unassociated client 102 has associated with the wireless network 120, and identify the AP 122 as a doorway AP (label doorway AP 116), in response to the client 102 associating to the AP 122.

Regarding classifications of clients more specifically, a passerby can be a client first detected by an AP of the wireless network 120. A doorway passerby can be identified by whether the AP, that first detected that passerby, has been previously recorded as an AP that first detects clients, and whether the client falls within a range of RSSI values (RSSI band) corresponding to previously detected clients. The client classification can be promoted to a visitor, if the following characteristics are satisfied: the client satisfies the doorway passerby classification, the client dwell time (remaining detected by the wireless network) is over a threshold (such as one minute, for example), and the client is detected by at least one associated AP in training data in the recorded associated AP's RSSI band. The client classification can be considered as engaged, if the client previously satisfies the visitor classification, and has a dwell time greater than a second threshold (such as five minutes, for example).

In other words, a passerby is a client 102 who has been detected by the wireless network 120 for the first time, and need not remain at the wireless network 120 for a longer time (but if so, check if the dwell time exceeds a threshold corresponding to promoting the categorization of the client beyond passerby). For example, if the client's dwell time is between one to three minutes, and/or the RSSI information 112 indicates higher signal strength, then the controller 110 can promote the client to a visitor. Thus, even if the client is spending some time window shopping, there was still some engagement rate of that client lingering around the store, worthy of promotion to visitor categorization.

A client 102 that has been classified as a doorway passerby can be promoted to visitor. Doorway status can be identified based on the access point 122 being classified as a doorway AP. For example, the RSSI information 112 for the client 102 indicates that the client was first detected by the door ay AP 122 when entering the wireless network 120. The controller 110 can store the RSSI information 112 temporarily, until determining whether the client 102 later associates 114 with the wireless network 120. After the client is associated 114, the controller 110 can label 116 the AP 122 as a doorway AP, by correlating the fact that first detection and RSSI information 112 were obtained by the AP 122, and the client 102 also later associated to the network, at which point the controller can persist the RSSI information 112 in storage.

The controller 110 can promote the client 102 to a visitor, if the following three criteria are met: 1) that the client 102 satisfied the criteria for being categorized as a doorway passerby; 2) the client 102 has satisfied a time threshold while remaining detected, the dwell time for a visitor; and 3) the client 102 has been detected by the wireless network 120 (e.g., by an AP of the wireless network, which may be present in addition to the illustrated single AP 122 illustrated) within a range of RSSI values (i.e., in the RSSI band) in which the client's data is associated.

Figure 2:
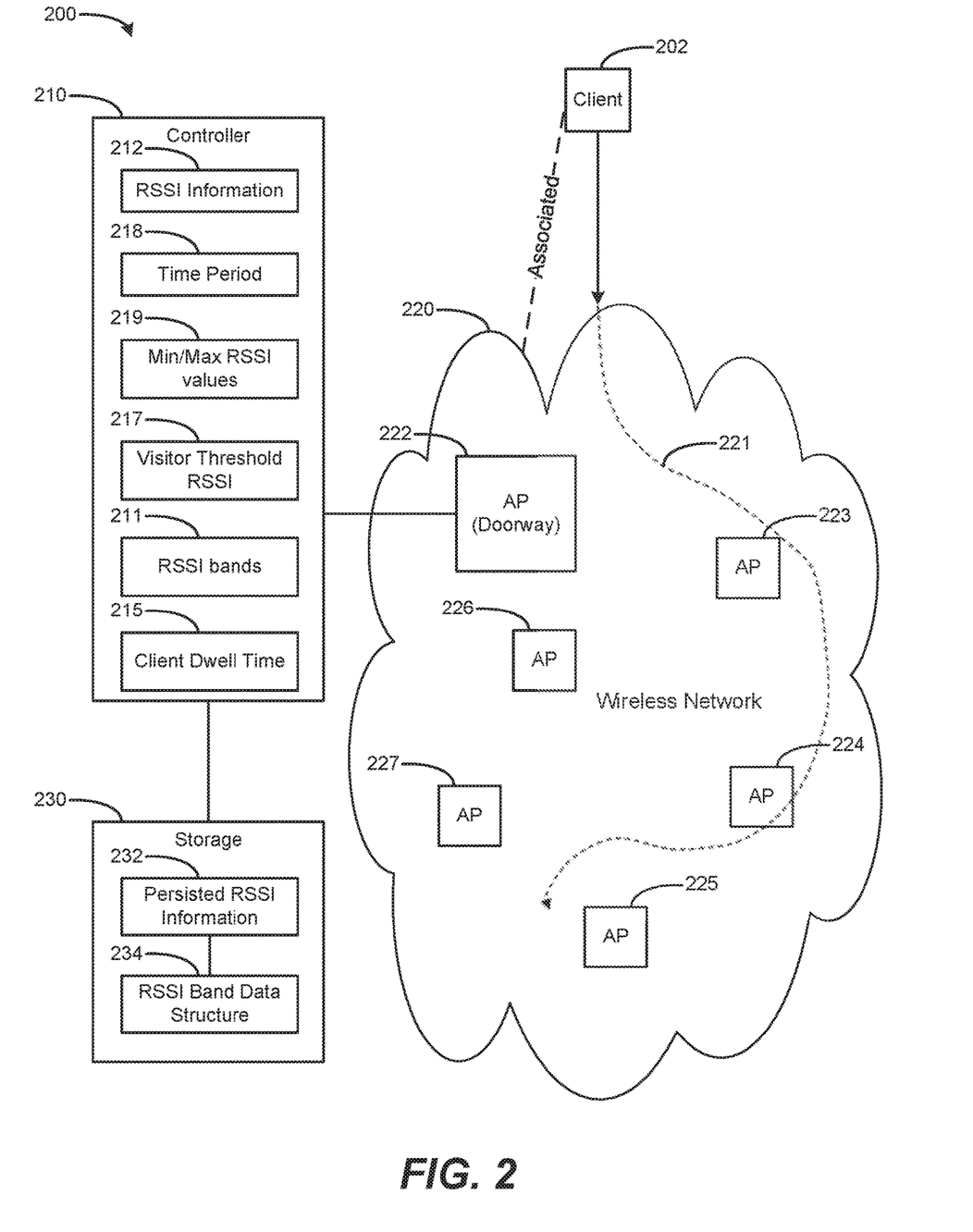
FIG. 2 is a block diagram of a computing system including a controller to store RSSI bands according to an example.

FIG. 2 is a block diagram of a computing system 200 including a controller 210 to store RSSI bands 211 according to an example. The controller 210 is also associated with RSSI information 212, time period 218, min/max RSSI values 219, visitor threshold RSSI 217, and client dwell time 215. The controller 210 can interact with storage 230 and wireless network 220 (e.g., via any of the APs 222-227). The storage 230 includes persisted RSSI information 232 and RSSI band data structure 234. The wireless network 220 includes a plurality of APs 222-227, and enables the client 202 to associate with the wireless network 220 and follow a path 221 through the wireless network 220.

The RSSI bands 211 can represent ranges of RSSI values 212. The RSSI bands 211 are used to categorize clients 202. For example, if a client 202 is detected with a −70 dBm RSSI value by AP 222, then the client 202 enters the wireless network 220 of the store, and gets associated to the wireless network 220 (e.g., via an AP 222-227) while having a different RSSI value, the controller 210 can track these events and information. The controller 210 thereby can track the RSSI information 212 for the client 202 upon being first detected in the store where the wireless network 220 is deployed, as well as the RSSI information 212 when the client 202 became associated. By having such information, the controller 210 can use the information for the next time a (potentially different) client 202 enters the wireless network 220. If the next client 202, upon detection of entry into the wireless network 220, falls into a similar range of RSSI values (e.g., within the same RSSI band 211) as the earlier recorded client, the controller 210 can identify the next client 202 as a doorway passerby, who has a probability of entering the network 220/store. The use of RSSI bands 211 creates flexibility in avoiding a need to match absolute numbers, such as with a rigid geofence approach. The RSSI bands 211 can be represented using flexible values, and are not limited to specific thresholds. For example, the RSSI bands 211 can be scaled by the controller 210 based on variations observed by the controller 210 over a period of time, observing whether the detected RSSI bands 211 produce behavior that correlates with a given range of RSSI values.

The controller 210 can maintain a history of the associated client 202, by persisting its stored RSSI information 212 as detected by the doorway AP 222 (which first detected the client 202 before the client became associated). The controller 210 can maintain such history as an initial RSSI band data structure 234 in storage 230. In other words, the history can be stored in a data structure such as a database or table with the training data (the training data including the data that is collected for clients 202 that are detected by the wireless network 220 and associate with the wireless network 220). The controller 210 will persist the RSSI information, which can include identified APs 222-227 that made detections and/or associations, and can include the RSSI band 211, in storage 230. The controller 210 can persist data in storage 230 for those clients 202 that became associated with an AP 222-227 within the store/wireless network 220, without a need to persist the clients 202 that were merely detected but not associated.

The controller 210 can identify the RSSI information 212 over a time period, to identify a minimum RSSI value and a maximum RSSI value 219 for the client 202 for a given AP 222-227. The controller 210 also can create an RSSI band 211 for the client 202 based on the minimum RSSI value 219, the maximum RSSI value 219, and an adjustment value. The adjustment value can be based on tuning, to divide the RSSI range (−127 dBm to 0 dBm) into a number of bands (e.g., between five to ten bands, or other numbers of bands). For example, an RSSI band 211 can represent RSSI values of −127 dBm to −122 dBm.

The controller 210 can identify a path 221 that is followed by an associated client 202 through the wireless network 220. The path 221 can be based on a series of access points 222-227 in the wireless network 220 detecting the associated client 202. The controller 210 is to classify a client 202 as a visitor based on a client dwell time 215 at the doorway AP 222 satisfying a visitor time period (e.g., between 1 and 3 minutes, subject to tuning/adjustment), and the client 202 being detected at a second AP 222-227 of the wireless network 220 in a direction along the path 221. The controller 210 also can classify a client 202 as a visitor based on a client dwell time 215 at the doorway AP 222 satisfying a visitor time period 218, and the RSSI information exceeding a visitor threshold value 217. For example, the client 202 can spend more than 2 minutes at the doorway AP, while having RSSI information 212 representing a value greater than −60 dBm.

The controller 210 can identify a plurality of RSSI bands 211, corresponding to a plurality of associated clients 202 (a single client 202 is shown, although a plurality of clients 202 is possible). The plurality of RSSI bands 211 can correspond to clients 202 that are statistically likely to associate with the wireless network 220. For example, the controller 210 can use correlations between earlier clients 202 that ultimately became associated with the wireless network 220, and the RSSI information 212/values those clients 202 demonstrated upon first being detected by the wireless network 220 (e.g., based on which AP 222-227 made the detection, and which AP 222-227 made the association, as well as the RSSI values during the detection and/or association). Furthermore, the controller 210 can classify a client 202 as a visitor based on a client dwell time 215 satisfying a visitor time period 218 (e.g., a threshold time sufficient to demonstrate that the client intends to visit, and is not just passing by), and the client's RSSI information 212 consistently falling in later RSSI bands of the plurality of RSSI bands (e.g., later bands 211 representing stronger RSSI signals sufficient to demonstrate that the client 202 was inside the store/range of the wireless network 220 internals). The stored RSSI information 212 can be persisted as a table in a database of a network accessible persistent store (e.g., storage 230).

The following is an example approach to maintain a history of associated clients 202. The controller 210 can maintain an initial RSSI Band 211 for doorway APs 222 (note: there can be more than one doorway AP 222 specified for a wireless network 220). The clients 202 that are not associated, and are detected by an AP 222-227 in the store for the first time are new unassociated clients 220. The controller 210 records the initial RSSI values/information 212 of the clients 202 (e.g., the initial RSSI values/information 212 can be those RSSI values/information 212 reported to the controller 210 within a period of the first ten seconds after being detected). The controller 210 creates an [initial] RSSI band 211 for clients 202, stored along with the AP 222-227 that detected the client 202. A band 211 can represent a range of minimum to maximum RSSI values detected, adjusted by an adjustment value. For example, a band can be the minimum reported RSSI for a client minus 5 dBm, to the maximum reported RSSI for the client plus 5 dBm. The controller 210 can record this RSSI information 212 for clients that a given AP 222-227 hears for the first time in the store/wireless network 220. Thus, the controller 210 can temporarily store RSSI information 212 on a per-client basis, such as: {Client1→(<ap_name>, <RSSI Band>); Client2→(<ap_name>, <RSSI Band>), . . . }. Accordingly, for a given client 202 that comes in range of the wireless network 220, the controller 210 is to record the RSSI band 211 where the client 202 was detected, and the first AP 222 where the client was detected. Whichever AP 222-227 reported its detection of the client 202 first, and the associated RSSI band 211, is tracked.

If a client 202 results in an association to the Wi-Fi network 220, e.g., indicative of the client 202 having footfall inside the store irrespective of which AP 222-227, the controller 210 is to select the associated client's record from the data structure recorded as the initial RSSI values/ information 212, and mark the information as an initial RSSI band 211 for the AP 222 that detected/reported the client 202 first. For example, for AP1 222, the initial RSSI band 211 can be set as RSSI1-RSSI2. Such AP initial RSSI information 212 can be persisted in storage 230 as persisted RSSI information 232 for clients 202 that become associated.

An AP 222 that detects new unassociated clients 202 on the wireless network 220/store for the first time, where the client 202 later results in an association to the wireless network 220, is termed as a doorway AP 222. The doorway AP 222 can be used for identifying client 202 status and promoting client status between different identifications. As more recent clients 202 are detected by the doorway AP 222 which result in later association to the wireless network 220, the initial RSSI band 211 data structure 234 can be updated, resulting in a list of RSSI ranges or bands 211. For example, the RSSI band data structure 234 can represent the APs 222-227 as follows: AP1→Initial RSSI Band→[<RSSI1−RSSI 2>, <−50−−55>, <−70−−75>, . . . ].

Thus, the controller 210 has recorded the first AP 222 and the RSSI band 211 that the client 202 was detected in, and whenever that client 202 is identified as being associated to an AP 222-227 inside the store/network 220, the controller records the RSSI 212 at which the client 202 got associated to the wireless network 220, and the RSSI range and which AP. The controller can mark such collected information as training data, that is, applying what is detected by a given AP 222-227 with an initial RSSI band 211, and which resulted in an association. The training data serves as a truth table for comparing other clients 202 that are detected. This procedure enables the controller 210 to identify a list of APs 222-227 (or a single AP 222, e.g., in the case of a single-AP wireless network 220 deployment) that are doorway APs 222, and identify a list of initial RSSI bands 211 in which clients 202 can be first detected.

With the APs 222-227 profiled for initial RSSI band 211 and identified as doorway AP 222 or non-doorway AP, the controller 210 can predict passersby in front of the doorway AP 222 (the network/store can have multiple doorways), and proceed to differentiate a client 202 passerby into two categories. 1) Passersby in the vicinity of the store, but who could be facing a wall or across floors or in an adjacent store and do not proceed to become visitors due to the lack of following a path 221 and/or becoming associated. 2) Passersby in front of the doorway AP 222 of the wireless network 220, who is heard on a doorway AP 222 and has reported RSSI values 212 falling in one of the RSSI bands 211 in the initial RSSI band data structure 234. Statistically, the controller can infer that this passerby client 202 has a good chance of entering the store/wireless network 220, because its pattern of initial detection and RSSI values fits a pattern of previously-seen visitors who also have entered the store/ wireless network 220 through that doorway AP 222 while demonstrating similar recorded RSSI values in the initial RSSI band.

The controller 210 can then predict which passersby are likely to become visitors in the store/wireless network 220, and promote the client 202 identity, as follows. Promote to visitor a passerby client 202 that has a dwell time at the doorway AP 222 for an acceptable client dwell time 215 (e.g., greater than one minute and less than three minutes), and that satisfies at least one of the following conditions: a. the RSSI values reported by the client 202 are consistently in the latter RSSI bands of the recorded RSSI bands 211 of associated clients for the doorway AP 222, indicating a relatively strong signal strength which correlates to a path 221 passing near the doorway AP 222, and/or b. the client is detected by another AP 2223-227 in the wireless network 220 that was in the direction of the path(s) 221 followed by those clients 202 that became associated clients 202. For example, the controller 210 can identify a given path 221 based on exhibiting a series of strong RSSI values near a series of corresponding APs along a path through the wireless network 220.

Figure 3:
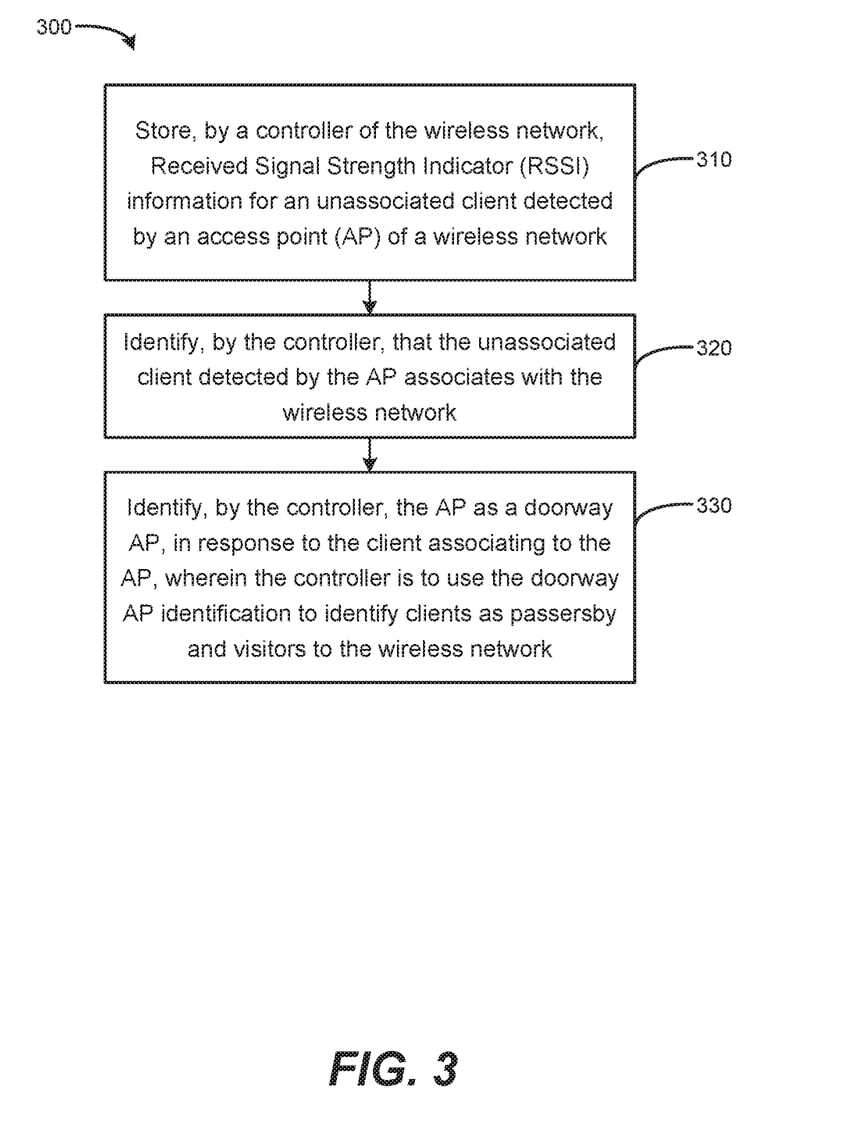
FIG. 3 is a flow chart based on identifying a doorway Access Point (AP) according to an example.
Figure 4:
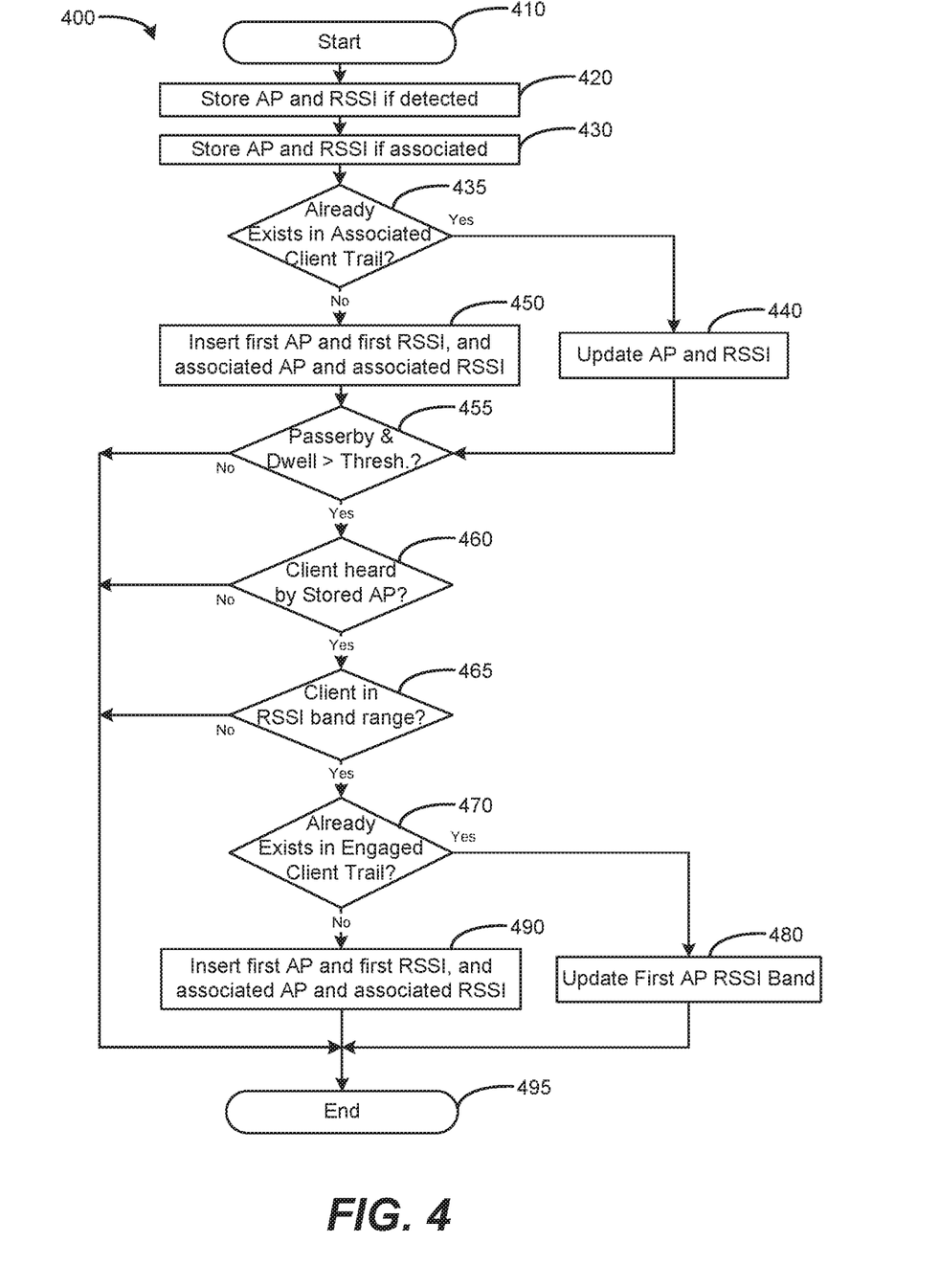
FIG. 4 is a flow chart based on updating RSSI and AP according to an example.

Referring to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 3 is a flow chart 300 based on identifying a doorway Access Point (AP) according to an example. In block 310, a controller of the wireless network is to store Received Signal Strength Indicator (RSSI) information for an unassociated client detected by an access point (AP) of a wireless network. For example, an AP can first detect a client that has not yet associated with the wireless network, indicating that the client is approaching the wireless network (e.g., the store/ premises in which the wireless network is deployed) along a path toward that AP. In block 320, the controller is to identify that the unassociated client detected by the AP associates with the wireless network. For example, the controller can temporarily store RSSI information for the various detected clients, and in response to a given client later associating with the wireless network, the controller can persist the information in storage. In block 330, the controller is to identify the AP as a doorway AP, in response to the client associating to the AP. The controller is to use the doorway AP identification to identify clients as passersby and visitors to the wireless network. For example, the controller can check whether the client exhibited a dwell time at the doorway AP sufficient to justify elevation from passerby status to visitor status. The controller also can check whether the client's RSSI values exceeded a threshold, or indicated a path through the wireless network with corresponding RSSI values that correlate with other client behavior for those clients that end up associated to the wireless network.

FIG. 4 is a flow chart 400 based on updating RSSI and AP according to an example, Flow begins at block 410. In blocks 420-430, training data can be created, based on stored behavioral history and paths of clients that have become associated. A client is profiled, and the controller records initial RSSI values on the AP that first detected the client at block 420. For example, the controller can store first_ap_name-(VARCHAR) and first_ap_rssi_band-(Set[rssi_range]]. At block 430, when a client gets associated, the controller can record assoc_ap_name-(VARCHAR) and assoc_ap_rssi_band-(Set[rssi_range]].

In blocks 435-450, the training data can be checked and/or updated in view of identifying a path(s) for an associated client(s). In block 435, the controller is to check in the training data whether a key for the (first_ap_name, assoc_ap_name) already exists. If yes it exists, then flow proceeds to block 440 and the controller is to update the assoc_ap_rssi_band set with a new rssid band range, and update the first_ap_rssi_band with a new value and a new rssid band range. Otherwise, if the training data does not already exist, flow proceeds from block 435 to block 450, in which the controller is to insert first_ap_name-(VARCHAR), first_ap_rssi_band-(Set[rssi_range]], assoc_ap_name-(VARCHAR), and assoc_ap_rssi_band-(Set[rssi_range]].

At blocks 455-465, the controller is to check the training data and whether the client is following a path corresponding to an engaged/associated client, to potentially add additional training sets to the training data. At block 455, the controller is to check if a client is passerby and has a dwell_time greater than a threshold (e.g., five mins), If no, flow proceeds to end at block 495. If yes, flow proceeds to block 460. At block 460, the controller is to check if the client is detected by any of the "assoc_ap_name" APs stored in the training data. If no, flow proceeds to end, and if yes, flow proceeds to block 465. At block 465, the controller is to check if the client is exhibiting RSSI information/values falling in the RSSI band range of the respective assoc_ap_rssi_band. If no, flow proceeds to end. If yes, flow proceeds to block 470.

At block 470, the controller is to check in the training data above if (first_ap_name, assoc_ap_name) key already exists, indicating that the client already exists in an engaged client path. If yes it exists, flow proceeds to block 480 and the controller is to update the First_ap_rssi_band with the new AP value and the new RSSI band range. Flow then ends at block 495. If at block 470 the controller determines that no the key does not already exist, flow proceeds to block 480 and the controller is to insert: first_ap_name-(VARCHAR), first_ap_rssi_band-(Set[rssi_range]], assoc_ap_name-(VARCHAR), and assoc_ap_rssi_band-(Set[rssi_range]]. Flow then ends at block 495. The approach outlined in FIG. 4 can be repeated multiple times for a given wireless network.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a controller engine to store RSSI/AP information of detected clients and identify whether the clients associate with a wireless network, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:
a controller communicatively coupled to a computer-readable storage;
wherein the controller is to:
receive an indicator that an access point (AP) of a wireless network has detected that an unassociated client is approaching the wireless network;
store, in the computer-readable storage, Received Signal Strength Indicator (RSSI) information for the unassociated client detected by the AP;
identify that the unassociated client has associated with the wireless network;
identify the AP as a doorway AP, in response to the client associating to the AP;
identify a path that is followed by an associated client through the wireless network;
classify a client as a visitor based on a client dwell time at the doorway AP satisfying a visitor time period, and the client being detected at a second AP of the wireless network in a direction along the path; and
determine a footfall of the classified visitors to the wireless network.

2. The system of claim 1, wherein the controller is to maintain a history of the associated client by persisting the stored RSSI information from the doorway AP.

3. The system of claim 2, wherein the controller is to maintain the history as an initial RSSI band data structure.

4. The system of claim 1, wherein the controller is to identify the RSSI information over a time period to identify a minimum RSSI value and a maximum RSSI value for the client for a given AP; and wherein the controller is to create an RSSI band for the client based on the minimum RSSI value, the maximum RSSI value, and an adjustment value.

5. The system of claim 4, wherein the adjustment value is based on tuning and is to divide the RSSI range, from −127 decibel-milliwatts (dBm) to 0 dBm, into between five to ten bands.

6. The system of claim 1, wherein the controller is to identify a path that is followed by an associated client through the wireless network, based on a series of access points in the wireless network detecting the associated client.

7. The system of claim 1, wherein the controller is to classify a client as a visitor based on a client dwell time at the doorway AP satisfying a visitor time period, and the RSSI information exceeding a visitor threshold value.

8. The system of claim 1, wherein the controller is to identify a plurality of RSSI bands corresponding to a plurality of associated clients, wherein the plurality of RSSI bands correspond to clients statistically likely to associate with the wireless network.

9. The system of claim 8, wherein the controller is to classify a client as a visitor based on a client dwell time satisfying a visitor time period, and the client's RSSI information consistently falling in later RSSI bands of the plurality of RSSI bands.

10. The system of claim 1, wherein the stored RSSI information is persisted as a table in a database of a network accessible persistent store.

11. A computer-implemented method, comprising:
receiving, in a controller, an indicator that an access point (AP) of a wireless network has detected that an unassociated client is approaching the wireless network;
storing, in a computer-readable storage communicatively coupled to the controller, Received Signal Strength Indicator (RSSI) information for the unassociated client detected by the AP;
identifying, by the controller, that the unassociated client detected by the AP associates with the wireless network;
identifying, by the controller, the AP as a doorway AP, in response to the client associating to the AP, wherein the controller is to use the doorway AP identification to:
identifying clients as passersby and visitors to the wireless network by:
identifying a path that is followed by an associated client through the wireless network, and
classifying a client as a visitor based on a client dwell time at the doorway AP satisfying a visitor time period and client being detected at a second AP of the wireless network in a direction along the path; and
determining, by the controller, a footfall of the identified visitors to the wireless network.

12. The method of claim 11, wherein the controller is to persist the stored RSSI information from the doorway AP for the associated client to maintain a history of the associated client, without persisting stored RSSI information for unassociated clients.

13. A non-transitory machine-readable storage medium encoded with instructions executable by a computing system that, when executed, cause the computing system to:
receive, in a controller of the computing system, an indicator that an access point (AP) of a wireless network has detected that an unassociated client is approaching the wireless network;
store, in a computer-readable storage communicatively coupled to the controller, Received Signal Strength Indicator (RSSI) information for the unassociated client detected by the AP;
identify, by the controller, that the unassociated client detected by the AP associates with the wireless network; and
identify, by the controller, the AP as a doorway AP, in response to the client associating to the AP, wherein the controller is to use the doorway AP identification to identify clients as passersby and visitors to the wireless network by identify identifying a path that is followed by an associated client through the wireless network, and classifying a client as a visitor based on a client dwell time at the doorway AP satisfying a visitor time period, and the client being detected at a second AP of the wireless network in a direction along the path; and
determine, by the controller, a footfall of the identified visitors to the wireless network.

14. The storage medium of claim 13, further comprising instructions that cause the computing system to store the RSSI information according to a plurality of RSSI bands.

15. The storage medium of claim 13, wherein the determined footfall comprises a footfall pattern relative to a location where the wireless network is deployed.

16. The storage medium of claim 13, further comprising determine, by the controller, a footfall of clients initially identified as passersby to the wireless network, the clients initially identified as passersby reclassified as visitors based on a client dwell time at the doorway AP satisfying the visitor time period and the client being detected by the wireless network.

17. The system of claim 1, wherein the determined footfall comprises a footfall pattern relative to a location where the wireless network is deployed.

18. The system of claim 1, further comprising the controller to classify a client as a passerby based on a client dwell time at the doorway AP, and the client not being detected at a second AP of the wireless network in a direction along the path.

19. The method of claim 11, wherein the determined footfall comprises a footfall pattern relative to a location where the wireless network is deployed.

20. The method of claim 11, further comprising determining, by the controller, a footfall of clients initially identified as passersby to the wireless network, the clients initially identified as passersby reclassified as visitors based on a client dwell time at the doorway AP satisfying the visitor time period and the client being detected by the wireless network.

\* \* \* \* \*